United States Patent [19]
Hulstein et al.

[11] Patent Number: 6,135,469
[45] Date of Patent: Oct. 24, 2000

[54] TAG AXLE MOUNTING SYSTEM

[75] Inventors: Gregory W. Hulstein, Sioux Center; Philip L. Kats, Hull, both of Iowa

[73] Assignee: Link Mfg., Ltd., Sioux Center, Iowa

[21] Appl. No.: 09/307,675

[22] Filed: May 10, 1999

[51] Int. Cl.$^7$ .................................................. B60G 1/00
[52] U.S. Cl. .............................. 280/86.5; 280/124.128; 280/124.13; 280/124.153; 280/124.177; 180/24.02
[58] Field of Search ........................... 280/86.5, 124.128, 280/124.13, 124.153, 124.177, 81, 34, 405; 180/24.02

[56] References Cited

U.S. PATENT DOCUMENTS

| | | | |
|---|---|---|---|
| 2,564,509 | 8/1951 | Shelton | 280/86.5 |
| 3,112,100 | 11/1963 | Prichard | 259/161 |
| 3,191,961 | 6/1965 | Brennan et al. | 280/81 |
| 3,191,963 | 6/1965 | Prichard | 280/81 |
| 3,215,384 | 11/1965 | Chambers | 280/124.13 |
| 3,246,884 | 4/1966 | Prichard et al. | 259/161 |
| 3,317,193 | 5/1967 | Buelow et al. | 259/161 |
| 3,479,049 | 11/1969 | Duecy | 280/81 |
| 3,504,930 | 4/1970 | Kozowyk | 280/124.13 |
| 3,511,493 | 5/1970 | Burrell | 280/124.128 |
| 3,567,189 | 3/1971 | Buelow | 259/176 |
| 3,633,879 | 1/1972 | Prichard | 259/172 |
| 3,704,896 | 12/1972 | Buelow | 280/81 A |
| 3,838,885 | 10/1974 | Brennan et al. | 298/22 R |
| 3,885,808 | 5/1975 | Derrwaldt | 280/81 R |
| 3,895,818 | 7/1975 | Fearon | 280/81 R |
| 3,907,855 | 9/1975 | Doennecke | 280/124.128 |
| 3,912,293 | 10/1975 | Harbers | 280/81 R |
| 3,985,036 | 10/1976 | Decker et al. | 74/96 |
| 4,032,116 | 6/1977 | Prichard | 259/69 |
| 4,063,779 | 12/1977 | Martin et al. | 398/221 |
| 4,082,305 | 4/1978 | Allison et al. | 280/81 R |
| 4,084,833 | 4/1978 | Mohrbacker et al. | 280/81 A |
| 4,350,358 | 9/1982 | Ferris | 280/81 R |
| 4,513,990 | 4/1985 | Morita et al. | 280/124.153 |
| 4,588,201 | 5/1986 | Mohrbacker | 280/405 R |
| 4,708,361 | 11/1987 | Takada et al. | 280/124.128 |
| 4,762,421 | 8/1988 | Christenson et al. | 366/54 |
| 4,782,044 | 11/1988 | Forssmann | 514/12 |
| 4,848,783 | 7/1989 | Christenson et al. | 280/405.1 |
| 4,940,287 | 7/1990 | Ritchie | 298/23 R |
| 5,833,026 | 11/1998 | Zetterstrom et al. | 280/124.13 |
| 6,019,435 | 2/2000 | Bach | 280/124.177 |

*Primary Examiner*—Lanna Mai
*Assistant Examiner*—Toan To
*Attorney, Agent, or Firm*—Zarley, McKee, Thomte, Voorhees & Sease; Dennis L. Thomte

[57] ABSTRACT

A tag axle which is pivotally mounted to the rear of a vehicle for selectively providing additional flotation for the vehicle. The tag axle includes first and second suspension arm mounts secured to the rearward ends of the frame members of the vehicle. First and second suspension arms are pivotally secured to the first and second mounts whereby the ground-engaging wheels at the rear of the tag axle may be pivotally moved between raised and lowered positions. The pivot connection between the suspension arms and the mounts enables the suspension arms to be pivotally secured thereto, regardless of the width of the frame members of the vehicle and regardless of the distance between the frame members.

3 Claims, 3 Drawing Sheets

TAG AXLE MOUNTING SYSTEM

BACKGROUND OF THE INVENTION

1. Field of the Invention

This invention relates to a tag axle assembly and more particularly to a tag axle mounting system wherein the tag axle is pivotally secured to the rearward end of a vehicle such as a transit concrete mixer. The tag axle of this invention is pivotally movable with respect to the vehicle between a first position in which the wheels of the tag axle are elevated and a second position in which the wheels engage the ground. The tag axle of this invention more particularly relates to a tag axle assembly which is designed so that a variable load may be placed upon the wheels when the wheels are in the ground-engaging position.

2. Description of the Related Art

Tag axle assemblies have been used for many years on work vehicles such as transit concrete mixers, gravel trucks, etc. The tag axle assemblies of the prior art permit the vehicle to carry more weight while still meeting the regulations governing the weight which the vehicles can legally carry over federal and state highways. Most of the prior art tag axle assemblies are pivotally movable with respect to the frame of the vehicle so that the wheels of the tag axle assembly may be pivotally moved from a ground-engaging position to an elevated position.

Although the tag axle assemblies of the prior art have apparently met with considerable success, the prior art tag axle assemblies suffer from many shortcomings. First, the prior art tag axle assemblies are not readily adaptable to vehicle frame width variations. Additionally, the prior art tag axle assemblies are not believed to be able to adapt to frame thickness variations. Further, the maintenance and service of the prior art tag axle assemblies appears to be rather complex, in most cases. Additionally, the prior art tag axles are not believed to be able to be conveniently and easily mounted on the frames of the vehicles nor is it believed that the prior art tag assemblies are able to control lateral movement of the tag axle in a satisfactory manner.

It is therefore a principal object of the invention to provide an improved tag axle assembly for a vehicle such as a transmit concrete mixer or the like.

Still another object of the invention is to provide a tag axle assembly which accommodates frame width variations and frame thickness variations.

Still another object of the invention is to provide a tag axle assembly of the type described wherein the maintenance and service thereof is uncomplicated and convenient.

Yet another object of the invention is to provide a tag axle mounting system which is extremely safe to use.

Yet another object of the invention is to provide a tag axle mounting system which controls lateral movement of the tag axle assembly with respect to the frame of the vehicle.

Yet another object of the invention is to provide a tag axle mounting system which is quickly and easily bolted onto the frame members of the vehicle.

Yet another object of the invention is to provide a tag axle mounting system including rubber bushings at the pivot points which permits compliance if frame twist or suspension twist occurs.

These and other objects will be apparent to those skilled in the art.

SUMMARY OF THE INVENTION

A tag axle mounting system is described wherein the tag axle is pivotally mounted to the rear of a vehicle such as a transit concrete mixer for selectively providing additional flotation for the vehicle with the vehicle including first and second, spaced-apart, longitudinally extending frame members having rearward and forward ends, and inner and outer sides. First and second suspension arm mounting assemblies are secured to the rearward ends of the first and second frame members, respectively. First and second suspension arms, having rearward and forward ends, are pivotally secured at their forward ends to the first and second mounting assemblies, respectively, and extend rearwardly therefrom. An axle assembly is mounted on the rearward ends of the first and second suspension arms and have wheels mounted thereon. A power actuated means, such as a hydraulic cylinder, is connected to the first and second suspension arms for moving the wheels into a ground-engaging position and for moving the wheels out of ground engagement. Each of the first and second suspension arms have a horizontally disposed tube, having inner and outer ends, secured to the forward ends thereof. Each of the first and second suspension arm mounting assemblies comprises: (a) a resilient bushing positioned in the tube and having a bore extending therethrough; (b) an outer frame bracket, having forward and rearward ends, secured to the associated frame member at the outer rearward end thereof and extending rearwardly therefrom; (c) the rearward end of the outer frame bracket having a first opening formed therein; (d) a first collar, having inner and outer ends, positioned in the first opening in the outer frame bracket and being secured to the outer frame bracket; (e) an inner frame bracket, having rearward and forward ends, secured to the associated frame member and extending rearwardly therefrom; (f) the rearward end of the inner frame bracket having a second opening formed therein; (g) a second collar having inner and outer ends, positioned in the second opening in the inner frame bracket and being secured to the inner frame bracket; (h) the first and second collars being horizontally spaced-apart; (i) the tube being positioned between the first and second collars; (j) a pivot pin, having a central portion, positioned in the resilient bushing and having tapered inner and outer ends positioned in the first and second collars, respectively; (k) a wear washer mounted on the pivot pin between the outer end of the tube and the inner end of the first collar; (l) an outer locking wedge mounted on the tapered outer end of the pivot pin and positioned in the first collar; (m) an outer mounting collar, having inner and outer ends, having its inner end extending into the outer end of the first collar and being in engagement with the outer locking wedge; (n) an outer bolt extending through the outer mounting collar and being threadably secured to the outer end of the pivot pin; (o) an inner locking wedge mounted on the tapered inner end of the pivot pin and being positioned in the second collar; (p) an inner mounting collar having inner and outer ends, having its inner end extending into the outer end of the second collar and being in engagement with the inner locking wedge; and (q) an inner bolt extending through the inner mounting collar and being threadably secured to the inner end of the pivot pin. In a preferred embodiment, the pivot pin has an annular shoulder formed therein inwardly of its tapered outer end with the wear washer being in engagement with the annular shoulder.

DESCRIPTION OF THE PREFERRED EMBODIMENT

Figure 1:
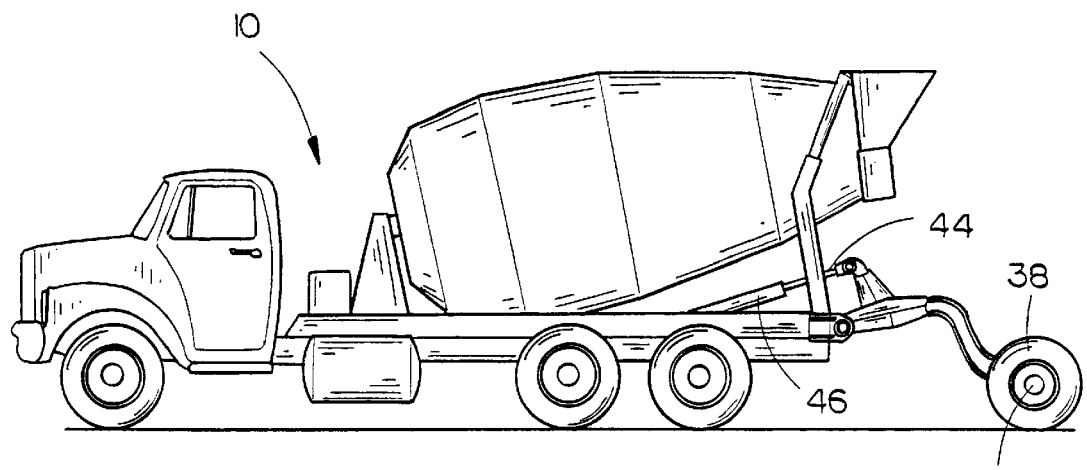
FIG. 1 is a side view of a transit concrete mixer having the tag axle of this invention mounted thereon.

The numeral 10 refers to a vehicle such as a transit concrete mixer. It should be understood that the tag axle assembly of this invention may be mounted on any vehicle requiring additional flotation in order for the vehicle to comply with state and federal highway regulations. Vehicle 10 includes spaced-apart, longitudinally extending frame members 12 and 14. Suspension arm mounting assemblies 16 and 18 are secured to the rearward ends of the frame members 12 and 14 in an identical fashion and, for that reason, only mounting assembly 16 will be described in detail.

Mounting assembly 16 includes an outer frame bracket 20 and an inner frame bracket 22 which are bolted to opposite sides of the web 24 of frame member 12 by a plurality of bolt assemblies 26 extending through the outer frame bracket 20, web 24, and inner frame bracket 22.

Figure 3:
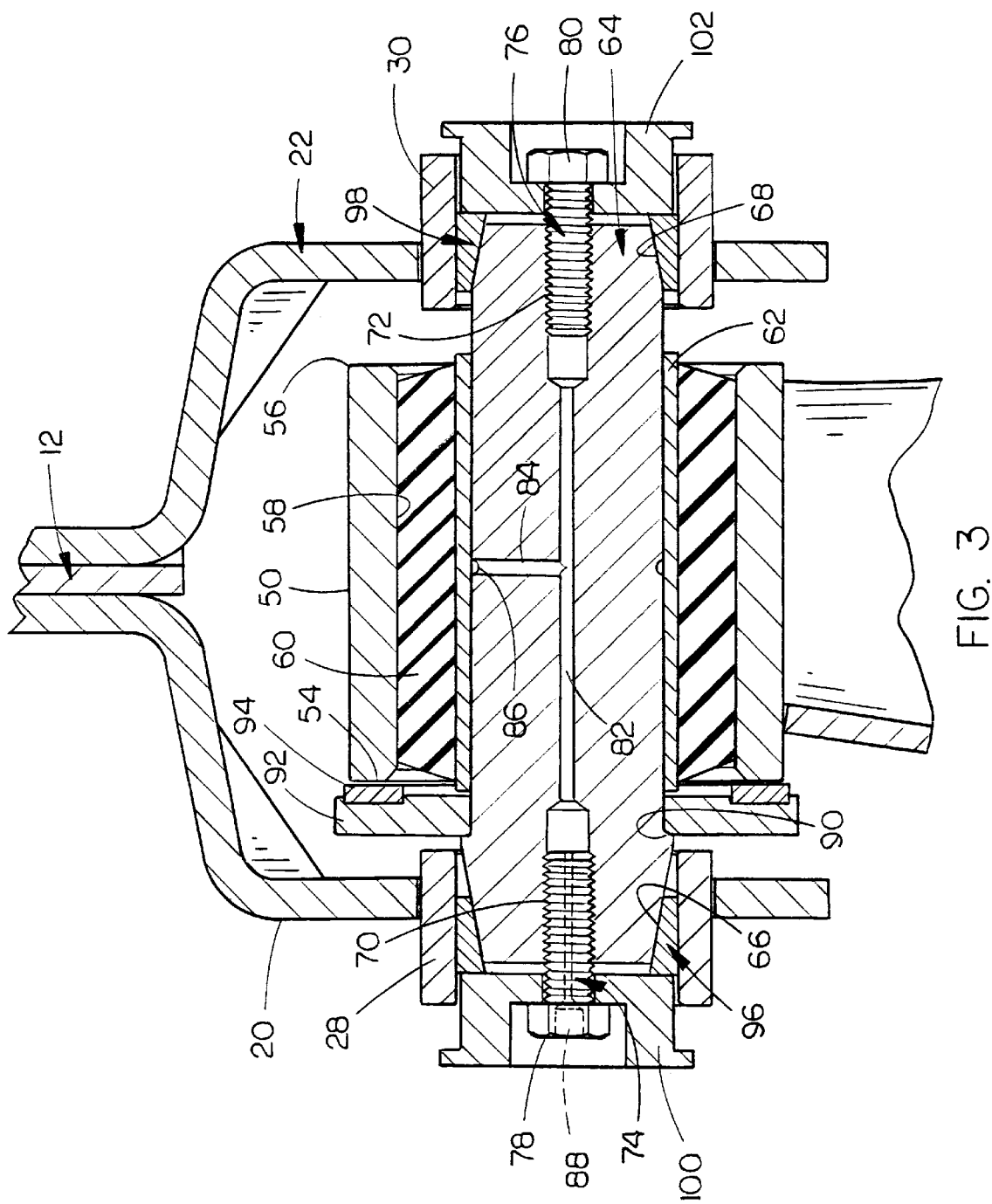
FIG. 3 is an enlarged sectional view taken through the pivotal connection of one of the suspension arms and the suspension arm mounting assemblies.
Figure 4:
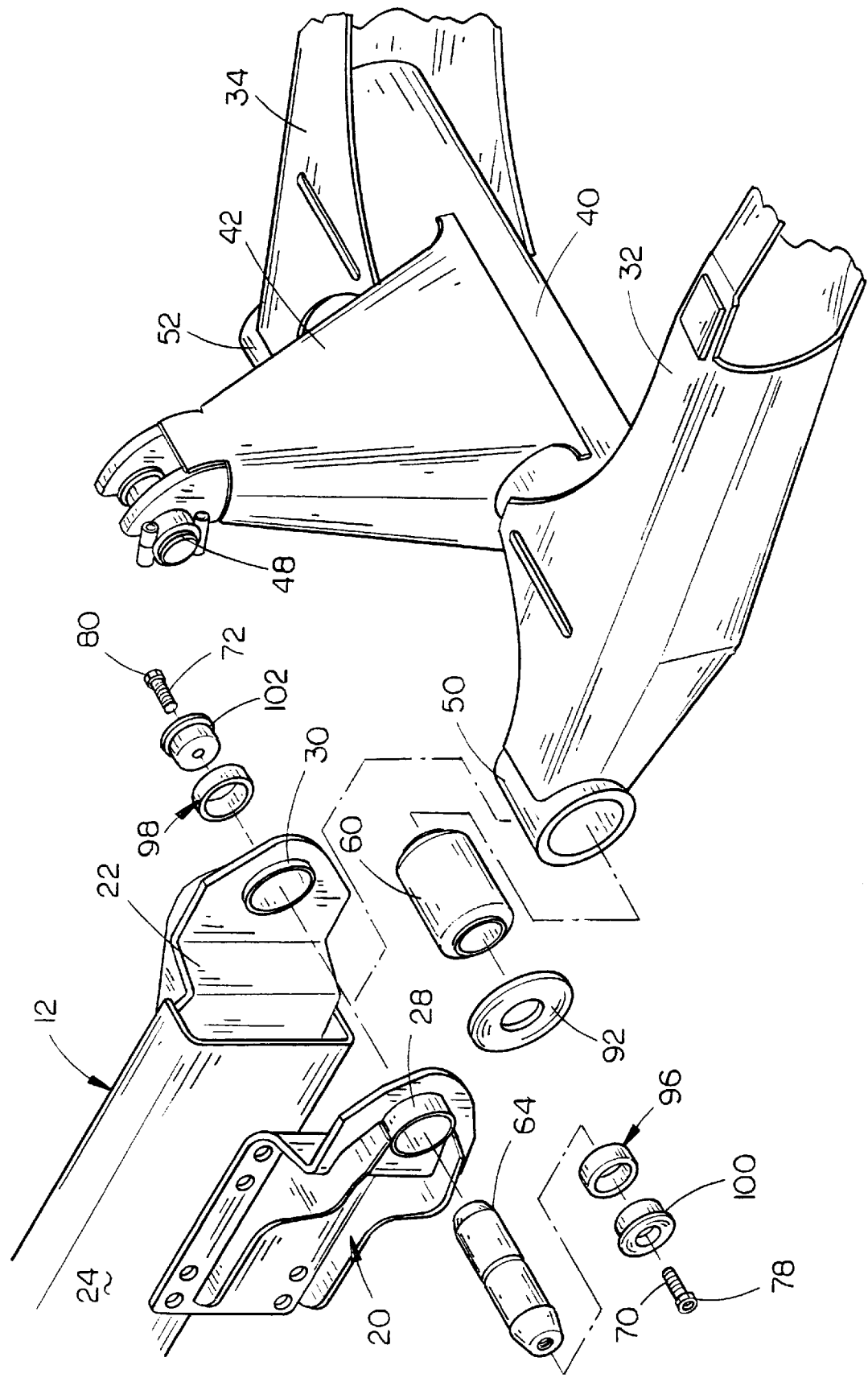
FIG. 4 is a partial exploded perspective view illustrating the manner in which one of the suspension arms is pivotally secured to one of the suspension arm mounting assemblies.

The rearward end of frame brackets 20 and 22 have collars or sleeves 28 and 30 secured thereto by welding or the like. As seen in FIG. 3, the inner ends of collars 28 and 30 are positioned slightly inwardly of the interior surfaces of frame brackets 20 and 22, respectively.

Figure 2:
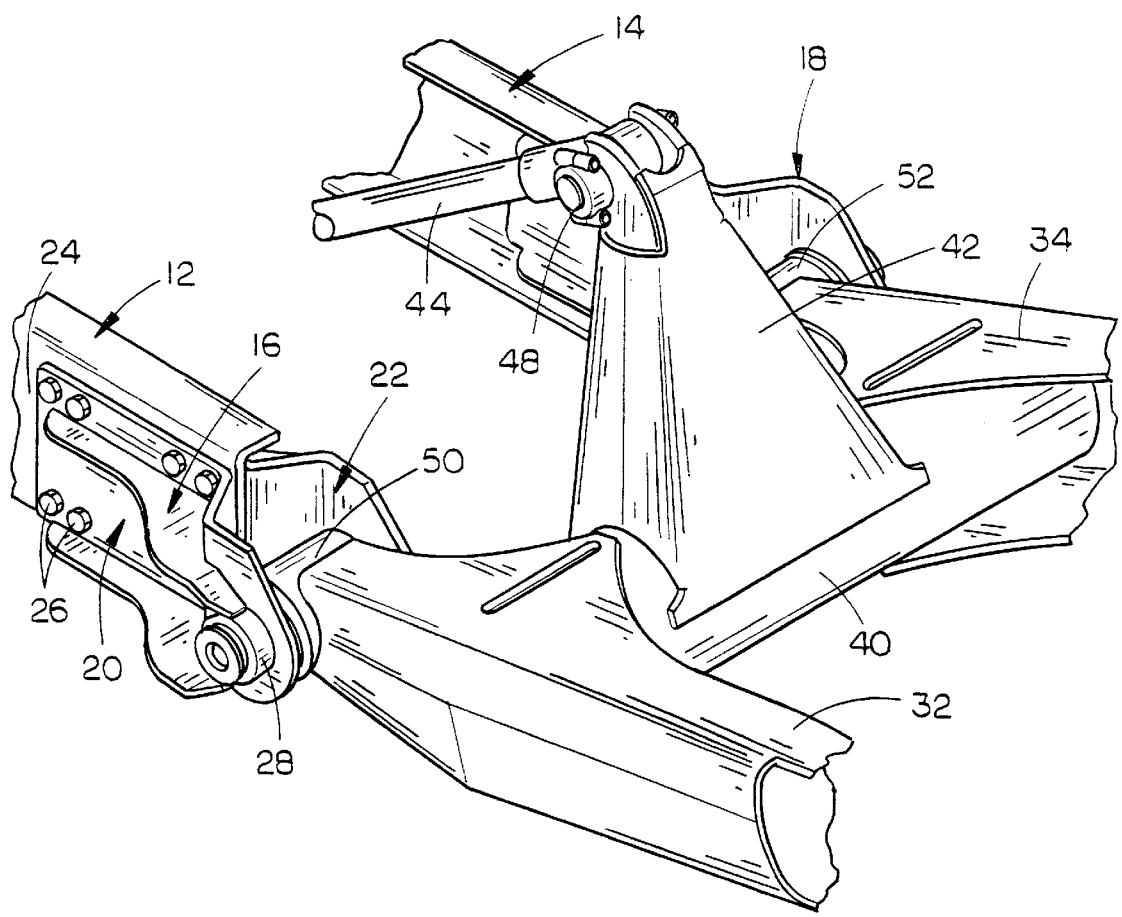
FIG. 2 is a partial perspective view of the tag axle of this invention.

Elongated suspension arms 32 and 34 are pivotally mounted on the mounting assemblies 16 and 18, as will be described in more detail hereinafter. An axle assembly 36 is provided at the rearward ends of the suspension arms 32 and 34 and has a pair of ground-engaging wheels 38 mounted thereon in conventional fashion. Tube 40 is secured to and extends between the suspension arms 32 and 34 at the forward end thereof, as best seen in FIG. 2. An upstanding post 42 is secured to tube 40 and has the rod or shaft 44 of hydraulic cylinder 46 pivotally secured thereto by means of pivot pin assembly 48. The base end of hydraulic cylinder 46 is pivotally connected to the frame of the vehicle for raising and lowering the wheels 36.

Tubular members 50 and 52 are provided at the forward ends of suspension arms 32 and 34. The tubular members 50 and 52 are pivotally connected to the mounting assemblies 16 and 18 in identical fashion. Therefore, only the pivotal connection of tubular member 50 with the mounting assembly 16 will be described in detail. For purposes of description, tubular member 50 will be described as having an outer end 54 and an inner end 56 as well as an interior surface 58. A rubber bushing 60 is positioned in tubular member 50 and has a metal bushing or sleeve 62 bonded thereto.

The numeral 64 refers to a metal pivot pin having a tapered outer end 66 and a tapered inner end 68. Pin 64 is provided with internally threaded openings 70 and 72 at its outer and inner ends, respectively, which are adapted to threadably receive bolts 74 and 76, respectively, which include head portions 78 and 80, respectively. An elongated bore 82 is formed in pivot pin 64 which extends between the inner ends of openings 72 and 74 and which communicates with a radially extending bore 84 which in turn communicates with an annular groove 86 formed in the outer surface of pivot pin 74 to enable oil or grease to be supplied to the interior of metal bushing 62. As seen in FIG. 3, bolt 70 has an elongated bore 88 extending therethrough to enable grease or oil to be delivered to the bore 82. Similarly, bolt 80 is provided with an elongated bore extending therethrough to enable oil or grease to be delivered therethrough.

As seen in FIG. 3, pivot pin 64 is provided with an annular shoulder 90 formed therein. A metal wear washer 92 embraces pivot pin 64 and is in engagement with the annular shoulder 90, as seen in FIG. 3. The inner surface of wear washer 92 is provided with an annular insert 94, comprised of a high wear material such as Ryertex™, which is adapted to be engaged by the outer end of the tubular member 50.

Locking wedges 96 and 98 embrace the tapered ends 66 and 68 of pivot pin 64 and are positioned within the collars 28 and 30, as seen in FIG. 3. Locking collars 100 and 102 extend into the ends of the collars 28 and 30 and engage the locking wedges 96 and 98, respectively. Locking collars 100 and 102 are drawn into engagement with the locking wedges 96 and 98, respectively, by the bolts 74 and 76, respectively.

The design of this invention accommodates frame width variations that occur between different types of trucks. The pivot pin/locking wedge/locking collar assembly can slide in the frame bracket collars 28 and 30 during installation. As the suspension is installed on the vehicle, the pivot pin/wear washer assembly is pushed against the suspension arm, which prevents lateral movement of the suspension. The pivot pin/locking wedge/locking collar assembly is then tightened, forcing the split locking wedges 96 and 98 over the tapered ends of the pivot pin 64 which creates a clamp fit between the outer surface of the locking wedges 96 and 98 and the inside diameters of the collars 28 and 30. This design also accommodates frame thickness variations that occur between different types of truck frames.

The maintenance and service of the assembly described herein is very simple and easy. To disassemble, the four locking collars at the forward ends of the suspension arms 32 and 34 are removed. Driving force is applied to the pivot pins which causes the outer locking wedges to break loose. Once the locking wedges are removed, the pivot pins may be removed.

The design of this invention is also what may be termed a fail-safe design. In the case where the locking wedge/pivot pin comes loose, the flange on the locking collars keeps the pivot pin in place. Further, the design of this invention controls lateral movement. The pivot pin/wear washer assembly controls lateral movement by restricting the lateral movement of the suspension arm. Washer 92 is easily replaceable.

The fact that the frame brackets bolt to the frame members 12 and 14 allows easy installation at any time during the manufacture of the vehicle. Yet another advantage of the design of this invention is that the rubber bushing 60 allows compliance if frame twist or suspension twist occurs. Also, the inner steel sleeve or bushing 62 pivots on the pivot pin keeping the rubber bushing from torsion or shear.

Thus it can be seen that the tag axle mounting system disclosed herein accomplishes at least all of its stated objectives.

We claim:

1. A tag axle for selectively providing additional floatation for a load-bearing vehicle including first and second, spaced-apart, longitudinally extending frame members having rearward and forward ends, and inner and outer sides, comprising:

first and second suspension arm mounting assemblies secured to the rearward ends of said first and second frame members, respectively;

first and second suspension arms, having rearward and forward ends, pivotally secured at their forward ends to said first and second mounting assemblies, respectively, and extending rearwardly therefrom;

an axle assembly mounted on the rearward ends of said first and second suspension arms;

wheels mounted on said axle assembly;

power actuated means connected to said first and second suspension arms for moving said wheels into a ground-engaging position and for moving said wheels out of ground engagement;

each of said first and second suspension arms having a horizontally disposed tube, having inner and outer ends, secured to the forward ends thereof;

each of said first and second suspension arm mounting assemblies comprising:

(a) a resilient bushing positioned in said tube and having a bore extending therethrough;

(b) an outer frame bracket, having forward and rearward ends, secured to the associated frame member at the outer rearward end thereof and extending rearwardly therefrom;

(c) said rearward end of said outer frame bracket having a first opening formed therein;

(d) a first collar, having inner and outer ends, positioned in said first opening in said outer frame bracket and being secured to said outer frame bracket;

(e) an inner frame bracket, having rearward and forward ends, secured to the associated frame member and extending rearwardly therefrom;

(f) said rearward end of said inner frame bracket having a second opening formed therein;

(g) a second collar, having inner and outer ends, positioned in said second opening in said inner frame bracket and being secured to said inner frame bracket;

(h) said first and second collars being horizontally spaced-apart;

(i) said tube being positioned between said first and second collars;

(j) a pivot pin having a central portion positioned in said resilient bushing and having tapered outer and inner ends positioned in said first and second collars, respectively;

(k) a wear washer mounted on said pivot pin between said outer end of said tube and inner end of said first collar;

(l) an outer locking wedge mounted on said tapered outer end of said pivot pin and positioned in said first collar;

(m) an outer mounting collar, having inner and outer ends, having its inner end extending into the outer end of said first collar and being in engagement with said outer locking wedge;

(n) an outer bolt extending through said outer mounting collar and being threadably secured to said outer end of said pivot pin;

(o) an inner locking wedge mounted on said tapered inner end of said pivot pin and positioned in said second collar;

(p) an inner mounting collar, having inner and outer ends, having its inner end extending into the outer end of said second collar and being in engagement with said inner locking wedge;

(q) an inner bolt extending through said inner mounting collar and being threadably secured to said inner end of said pivot pin.

2. The tag axle of claim 1 wherein said pivot pin has an annular shoulder formed therein inwardly of its tapered outer end and wherein said wear washer is in engagement with said annular shoulder.

3. A tag axle for selectively providing additional floatation for a load-bearing vehicle including first and second, spaced-apart, longitudinally extending frame members having rearward and forward ends, and inner and outer sides, comprising:

first and second suspension arm mounting assemblies secured to the rearward ends of said first and second frame members, respectively;

first and second suspension arms, having rearward and forward ends, pivotally secured at their forward ends to said first and second mounting assemblies, respectively, and extending rearwardly therefrom;

an axle assembly mounted on the rearward ends of said first and second suspension arms;

wheels mounted on said axle assembly;

power actuated means connected to said first and second suspension arms for moving said wheels into a ground-engaging position and for moving said wheels out of ground engagement;

each of said first and second suspension arms having a horizontally disposed tube, having inner and outer ends, secured to the forward ends thereof;

each of said first and second suspension arm mounting assemblies comprising:

(a) an outer frame bracket, having forward and rearward ends, bolted to the associated frame member at the outer rearward end thereof and extending rearwardly therefrom;

(b) an inner frame bracket, having rearward and forward ends, bolted to the associated frame member at the inner rearward end thereof and extending rearwardly therefrom;

(c) said tube being positioned between the rearward ends of said inner and outer frame brackets;

(d) and pivot means pivotally connecting said tube to said outer and inner frame brackets;

(e) said pivot means including compensation connecting means which enables said tube to be pivotally connected to said inner and outer frame brackets regardless of the thickness of the associated frame member and regardless of the distance between said mounting assemblies.

\* \* \* \* \*